US012597680B2

(12) United States Patent
Lee et al.

(10) Patent No.: US 12,597,680 B2
(45) Date of Patent: Apr. 7, 2026

(54) BUSBAR AND BATTERY MODULE INCLUDING SAME

(71) Applicant: SK On Co., Ltd., Seoul (KR)

(72) Inventors: Gang U Lee, Daejeon (KR); Dong Min Kim, Daejeon (KR); Tae Gu Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 47 days.

(21) Appl. No.: 17/547,851

(22) Filed: Dec. 10, 2021

(65) Prior Publication Data

US 2022/0200101 A1     Jun. 23, 2022

(30) Foreign Application Priority Data

Dec. 21, 2020     (KR) ........................ 10-2020-0180155

(51) Int. Cl.
 *H01M 50/505*     (2021.01)
 *H01M 50/536*     (2021.01)
(52) U.S. Cl.
 CPC ....... *H01M 50/505* (2021.01); *H01M 50/536* (2021.01); *H01M 2220/20* (2013.01)
(58) Field of Classification Search
 CPC ............. H01M 50/505; H01M 50/536; H01M 2220/20
 See application file for complete search history.

(56) References Cited

U.S. PATENT DOCUMENTS

| | | | |
|---|---|---|---|
| 6,359,770 B1 | 3/2002 | Kolody et al. | |
| 2008/0128150 A1 | 6/2008 | Kimmel | |

| | | | | |
|---|---|---|---|---|
| 2010/0081041 | A1* | 4/2010 | Okada | ............... H01M 10/6557 |
| | | | | 429/153 |
| 2013/0017436 | A1 | 1/2013 | Kume | |
| 2016/0211499 | A1* | 7/2016 | Cho | ................... H01M 50/264 |

(Continued)

FOREIGN PATENT DOCUMENTS

| | | | | |
|---|---|---|---|---|
| CN | 106025162 A | * 10/2016 | ............. | H01M 2/22 |
| CN | 210200847 U | 3/2020 | | |

(Continued)

OTHER PUBLICATIONS

Machine translation of DE-102018106049-A1 (Year: 2023).*

(Continued)

*Primary Examiner* — Jeffrey T Barton
*Assistant Examiner* — Albert Michael Hilton
(74) *Attorney, Agent, or Firm* — IP & T GROUP LLP

(57) ABSTRACT

According to an embodiment, there is provided a busbar having a bent shape is proposed. The busbar includes: a body connector having a plate shape configured to electrically connect a plurality of battery cells to each other; and a bent connector branched outwardly from a side edge of the body connector and electrically connected to an external component. The bent connector starts to bend on the basis of a folding line positioned therein with a predetermined distance from the side edge of the body connector, so that current may be stably transmitted between the body connector and the bent connector without an electric current bottleneck phenomenon. According to an embodiment, there is also provided a battery module for secondary batteries, the battery module including the bent-shaped busbar.

11 Claims, 6 Drawing Sheets

(56) References Cited

U.S. PATENT DOCUMENTS

| 2016/0254515 A1* | 9/2016 | Shimoda ............. H01M 50/262 |
|---|---|---|
| | | 429/61 |
| 2016/0329544 A1 | 11/2016 | Zhang et al. |
| 2017/0062780 A1 | 3/2017 | Bae |
| 2020/0028142 A1 | 1/2020 | Devos et al. |
| 2020/0112014 A1 | 4/2020 | Kim et al. |

FOREIGN PATENT DOCUMENTS

| DE | 102018106049 A1 * | 9/2018 | ............. B23K 26/21 |
|---|---|---|---|
| DE | 102018004217 A1 * | 11/2019 | |
| EP | 3343672 A1 | 7/2018 | |
| EP | 3565021 A2 | 11/2019 | |
| EP | 3694022 A2 | 8/2020 | |
| JP | 2012182864 A | 9/2012 | |
| KR | 10-2016-0089133 A | 7/2016 | |
| KR | 20170095052 A | 8/2017 | |
| KR | 20190073933 A | 6/2019 | |
| KR | 10-2020-0097511 A | 8/2020 | |
| WO | 2017017915 A1 | 2/2017 | |
| WO | 2017130705 A1 | 8/2017 | |
| WO | 2019187312 A1 | 10/2019 | |
| WO | 2022009667 A1 | 1/2022 | |

OTHER PUBLICATIONS

Machine translation of DE-102018004217-A1 (Year: 2023).*
Machine translation of CN106025162A (Year: 2024).*
EP21216041.0 Partial European Search Report dated May 24, 2022, 16 pgs.
EP21216041.0 Extended European Search Report dated Jul. 26, 2022, 15 pgs.
KR20200180155 Office Action dated Mar. 6, 2023, 14 pgs.
Notice of Allowance for Korean Patent Application No. 10-2024-0071060 issued by the Korean Patent Office on Feb. 4, 2025.

* cited by examiner

BUSBAR AND BATTERY MODULE INCLUDING SAME

CROSS REFERENCE TO RELATED APPLICATION

The present application claims the benefit of and priority to Korean Patent Application No. 10-2020-0180155, filed Dec. 21, 2020, the entire contents of which is incorporated herein for all purposes by this reference.

BACKGROUND OF THE INVENTION

Field of the Invention

Embodiments relate to a busbar and a battery module for secondary batteries, the battery module including the busbar.

Description of the Related Art

In general, secondary batteries are batteries capable of repeatedly performing charging and discharging, and are applied as a power source for electric vehicles (EVs), hybrid electric vehicles (HEVs), etc.

As is widely known to those skilled in the art, each secondary battery includes an electrode assembly, external material for a pouch for accommodating the electrode assembly, and electrode tabs configured to extend from the electrode assembly and be exposed to the outside. Secondary batteries are used in high-output EVs or hybrid EVs by connecting a plurality of secondary batteries in series and/or in parallel. The plurality of secondary batteries is fixed by using a member, such as a cover or a casing, whereby the plurality of secondary batteries is electrically connected to each other by a busbar or the like, so that each secondary battery may be used in a form of a single battery module.

As described above, in order to electrically connect the plurality of secondary batteries, the busbar is in contact with electrode tabs respectively extending from the plurality of secondary batteries, and is placed on one side of the battery module in order to transmit current of the secondary batteries to the outside.

A conventional busbar is configured to form a bent part for buffering stress between two connection parts respectively connected to electrode terminals, and process a notch part (refer to FIG. 6 of Patent Document 1) at a boundary area of the bent part, so as to ensure easy bending forming. The notch part may be easily deformed by removing the area of an edge of the bent part to form a bottle neck section narrower than other areas. However, in a conductive medium through which current flows, a cross-sectional area is inversely proportional to electrical resistance, and the bent part reduces the cross-sectional area by forming the notch part, thereby resulting in excessive heat generation due to high voltage current. The excessive heat generation may damage the battery module, and cause problems, such as fire occurrence, explosion, and the like, depending on a magnitude of heat generation.

Documents of Related Art (Patent Document 1) International Patent Application Publication No. WO/2017/017915

SUMMARY OF THE INVENTION

The present disclosure is devised to solve the above problems, and an objective of the present disclosure is to provide a high voltage busbar that is bendable and formable while maintaining and ensuring a cross-sectional area of an electric current path through which a high voltage current flows.

In addition, another objective of the present disclosure is to ensure an efficient coupling state between a busbar plate and electrode tabs of a busbar assembly, even in a limited space by adjusting bending directions of the electrode tabs electrically connected to the busbar plate.

In addition, the present disclosure is configured to improve stability and reliability of a battery module by means of the above-described high voltage busbar.

In order to achieve the above objectives, the busbar according to various embodiments of the present disclosure includes: a body connection part in a plate shape and configured to electrically connect a plurality of battery cells to each other; and a bent connection part branched outwardly from a side edge of the body connection part and electrically connected to an external component. Here, the bent connection part may start to bend on the basis of an imaginary folding line positioned therein with a predetermined distance from the side edge of the body connection part so that electric current may be transmitted stably between the body connection part and the bent connection part without an electric current bottleneck phenomenon.

The busbar according to the present disclosure may arrange the folding line in parallel to and adjacent to the side edge of the body connection part on which a fixed end of the bent connection part is disposed.

In addition, the folding line may be formed to be longer than a width of the fixed end of the body connection part.

Optionally, the bent connection part may be bent and formed in a U-shape at an end of the side edge of the body connection part.

The busbar according to the present disclosure may be made of a conductive material having ductility.

A battery module according to the exemplary embodiment of the present disclosure includes: a plurality of battery cells; a housing configured to accommodate the plurality of battery cells; a side plate configured to allow electrode tabs respectively extending from the plurality of battery cells to be drawn out; a busbar plate coupled to the side plate and configured to provide electrical connections between the plurality of adjacent battery cells through coupling with the electrode tabs; and a busbar coupled to the busbar plate and configured to provide an electric current path. Here, some of the electrode tabs may be bent in a first lateral direction to be coupled to the busbar plate, and some of the rest of the electrode tabs may be bent in a second lateral direction opposite to the first lateral direction to be coupled to the busbar plate.

In addition, in the present disclosure, each electrode tab bent in the second lateral direction may be respectively drawn out from each outermost battery cell coupled to the busbar plate among the plurality of battery cells.

Each electrode tab bent in the second lateral direction may respectively overlap with each adjacent electrode tab and may be coupled to the busbar plate.

Optionally, in the present disclosure, the busbar plate and the busbar may be coupled to each other by laser welding.

In the exemplary embodiment of the present disclosure, the side plate may include: draw-out holes configured to respectively allow passing through of the electrode tabs; a coupling protrusion configured to extend outwardly to help align the busbar plate and the busbar with each other; and a module terminal coupled to the busbar and comprising a female screw hole formed therein in a thickness direction.

Meanwhile, the busbar plate may include: busbar holes formed at positions respectively corresponding to the draw-out holes; and a first position determination hole configured to allow passing through of the coupling protrusion.

Furthermore, the busbar may include: a body connection part in a plate shape and having a surface thereof in contact with the busbar plate and configured to extend in one direction; and a bent connection part branched outwardly from the side edge of the body connection part and coupled to the module terminal in a shape that wraps around the module terminal.

The bent connection part may include: a first extension part configured to extend by being bent in a first direction; a second extension part configured to extend by being bent in a second direction; and a third extension part configured to extend by being bent in a third direction.

In the present disclosure, the side edge of the body connection part may extend to the first extension part in a straight line.

Optionally, the busbar may be formed by bending the bent connection part into a U-shape that is open to a side thereof to accommodate the module terminal of the side plate.

In addition, the bent connection part may include through-holes, each having an inner diameter greater than an inner diameter of the female screw hole, at a position corresponding to the female screw hole of the module terminal.

According to the present disclosure, the body connection part may include a second position determination hole at a position corresponding to a first position determination hole of the busbar plate.

The features and advantages of the present disclosure will become more apparent from the following detailed description taken in conjunction with the accompanying drawings.

Prior to this, the terms or words used in the present specification and claims should not be construed as conventional and dictionary meanings, but it should be interpreted as meaning and concept consistent with the technical spirit of the present disclosure on the basis of the principle that the inventor can adequately define the concept of each term to best describe his or her invention.

According to the description of the present disclosure, the present disclosure may ensure a coupling state between a busbar plate and electrode tabs efficiently even in a limited space by adjusting bending directions of the electrode tabs electrically connected to the busbar plate.

The present disclosure may provide a busbar that is bendable without forming a notch part for bending forming.

In particular, embodiments of the present disclosure may prevent an electric current bottleneck phenomenon caused by the notch provided on an electric current path of the busbar, and may ensure favorable bending formation. Embodiments of the present disclosure may provide an identical cross-sectional area to the bent part of the busbar by bending a bent connector relative to a body connector along an imaginary folding line positioned in an inner area of the body connector in parallel to a fixed end of the bent connector. In this way, stable current transmission may be ensured by providing an identical internal resistance value on the electric current path extending from the body connector to the bent connector.

DETAILED DESCRIPTION OF THE INVENTION

Figure 1:
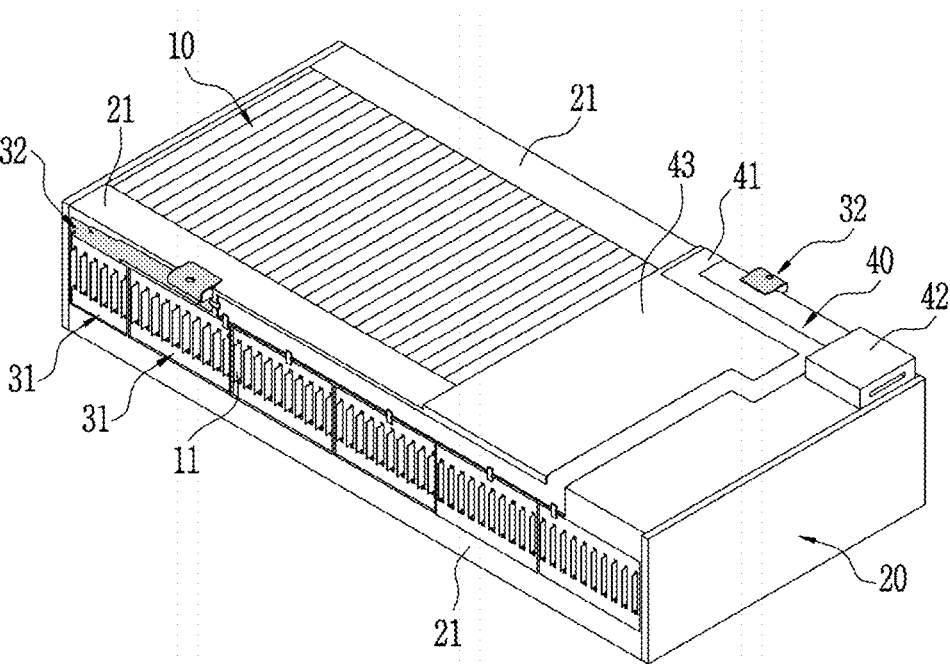
FIG. 1 is a perspective view schematically illustrating a battery module according to an embodiment of the present disclosure.

Objectives, specific advantages and novel features of the present disclosure will become more apparent from the following detailed description and embodiments described in conjunction with the accompanying drawings. In adding reference numerals to the components of each drawing, it should be noted that the same reference numerals are used to refer to the same components as much as possible even if displayed on different drawings. In addition, in describing the present disclosure, when it is determined that a detailed description of a related known technology may unnecessarily obscure the subject matter of the present disclosure, the detailed description thereof will be omitted. In this specification, terms such as first, second, etc. are used to distinguish one component from another component, and the components are not limited by the terms. In the accompanying drawings, some components are exaggerated, omitted, or schematically illustrated, and the size of each component does not fully reflect the actual size.

Hereinafter, various embodiments of the present disclosure will be described in detail with reference to the accompanying drawings.

Referring to FIGS. 1 to 7, a battery module according to an embodiment of the present disclosure includes: one or more battery cells 10; a housing 20 configured to accommodate the one or more battery cells 10; a busbar assembly 30 arranged on a side surface of the housing 20 and positioned on a side plate 21 such that electrode tabs 11 extend from the one or more battery cells 10; and a sensing module 40 configured to interconnect the busbar assembly 30 and a flexible printed circuit board 41.

In an embodiment of the present disclosure, one or more battery cells 10 are arranged side by side in the above-described housing 20, and have a structure in which the electrode tabs 11 of the electrode assembly extend from the one or more battery cells 10. For example, the battery cells 10 may be pouch-type secondary batteries. The electrode tabs 11 are terminals electrically connected to each of the other secondary batteries or an external device, for example, a busbar assembly, and may be composed of a positive electrode tab and a negative electrode tab.

As is well known to those skilled in the art, the electrode assembly alternately arranges separators between the positive and negative plates, and is a power generation element that is wound in a spiral form with the separators interposed between the positive and negative plates. The present disclosure is not limited thereto, and in the electrode assembly, the positive electrode plates, the separators, and the negative electrode plates may be sequentially arranged to be stacked. The positive electrode tabs and the negative electrode tabs may be respectively and electrically connected to the positive electrode plates and the negative electrode plates. As shown in the figures of the present disclosure, the electrode tabs 11 may be arranged to face a direction opposite to each other relative to a longitudinal direction of the battery cell. The present disclosure is not limited thereto, and the electrode tabs may protrude side by side in the same direction relative to the longitudinal direction of the battery cell.

Here, the longitudinal direction of the battery cells corresponds to a direction perpendicular to the stacking direction of the battery cells, that is, a direction in which the electrode tabs 11 extend.

In the present disclosure, one or more battery cells 10 are vertically stacked and fixedly positioned by the housing 20, and the stacked battery cells 10 are electrically connected to each other to provide a high voltage to an EV or the like.

Specifically, the housing 20 is formed in a size and shape capable of accommodating one or more battery cells 10 in an upright position along the stacking direction of the battery cells 10, and is provided with side plates 21 on opposite sides in the longitudinal direction of the battery cells 10. Each side plate 21 is provided with one or more holes 21a formed in the inner area thereof to allow passing through of the electrode tabs 11 of the battery cells 10, and includes a module terminal 211 supporting and holding the busbar 32 of the busbar assembly 30 by extending to protrude outwardly at a predetermined distance from the holes 21a. The number of holes 21a may be determined by the number of battery cells 10, and the distance between the holes 21a may be determined according to a distance between the battery cells 10. The housing 20 and the side plates 21 may be composed of an electrically insulating material, optionally from a plastic material.

In addition, the module terminal 211 is inserted, in a press fit manner, into a bent connector 322 that is bent in a U-shape to be described later, and may be provided with each of edge steps (no reference number) around opposite edges of the module terminal 211 in order to prevent unnecessary sliding of the bent connector 322. A separation distance Wa between the two edge steps arranged in parallel may have a size equal to or slightly larger than a width length Wb of the bent connector 322, so as to allow mounting of the bent connector 322 between the edge steps. In addition, the module terminal 211 may form a female screw hole 211a that helps fastening of a bolt B in the thickness direction thereof.

According to various embodiments of the present disclosure, a busbar assembly 30 is arranged on a side plate 21 at each of opposite ends in the extending[?] direction of the electrode tabs 11 of the battery cells 10. The busbar assembly 30 may be composed of a combination of a busbar plate 31 and a busbar 32, which will be described in detail below. The busbar assembly 30 includes the busbar 32 coupled and supported in a surface contact state and electrically communicable on the busbar plate 31 arranged on the side plate 21.

Specifically, the busbar plate 31 is a conductive member for electrically connecting to one or more electrode tabs 11 exposed to the outside through the holes 21a of the side plate 21, and is a component that is arranged by coupling to the side plate 21 and configured to provide electrical connections between adjacently arranged battery cells 10. As is known to those skilled in the art, the busbar plate 31 may be embedded and coupled to the side plate 21 so as to have one surface thereof exposed to the outside. In addition, the busbar plate 31 arranged on the side plate 21 may be arranged to be mutually insulated from busbar plates 31 arranged adjacently on the same side plate 21 (refer to FIG. 1).

As shown, the busbar plate 31 is provided with, in the inner area thereof, busbar holes 31a having a slit-shape and respectively corresponding to holes 21a, and at least one or more first position determination holes 31b that help select a position of the busbar plate 31. In the battery module according to various embodiments of the present disclosure, the holes 21a and the busbar holes 31a may be formed in a size and shape that allow the electrode tabs 11 to be inserted therethrough.

Figure 2:
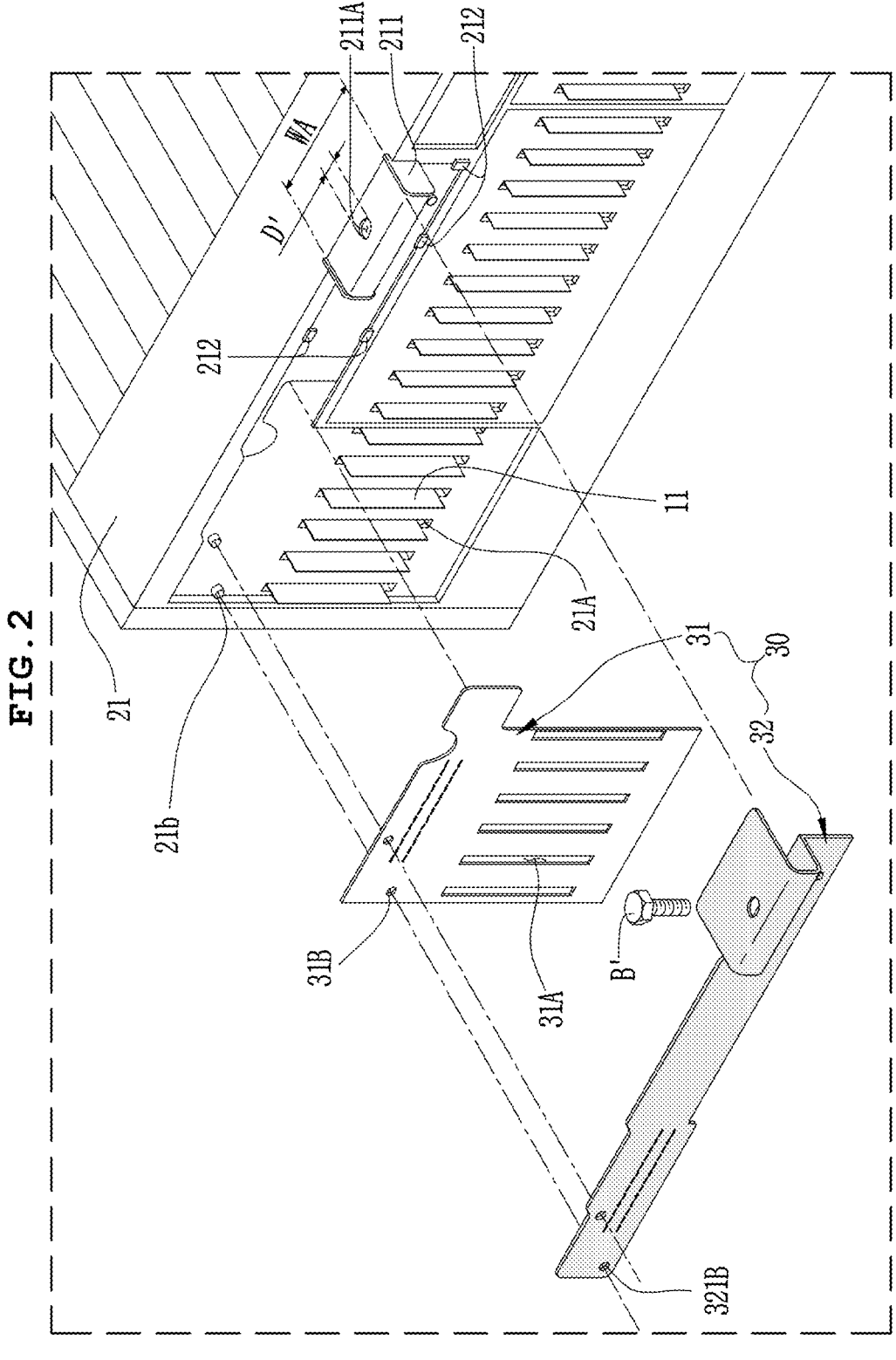
FIG. 2 is an exploded perspective view illustrating a main part of the battery module according to an embodiment of the present disclosure.
Figure 3A:
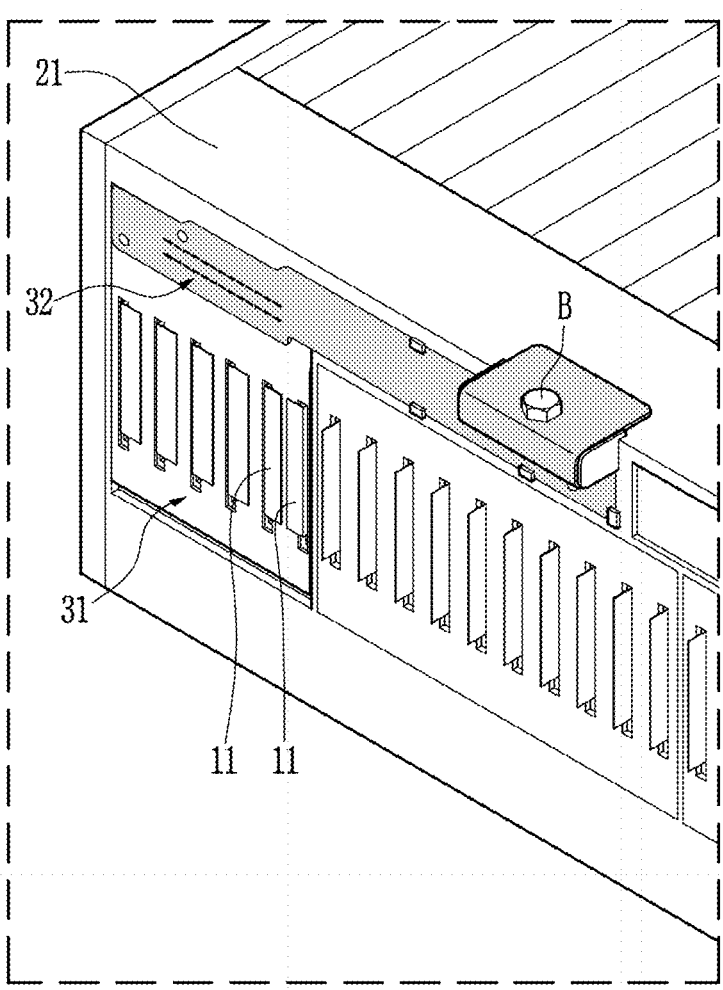
FIG. 3A is a view schematically illustrating a connection method between a busbar plate and electrode tabs.
Figure 3B:
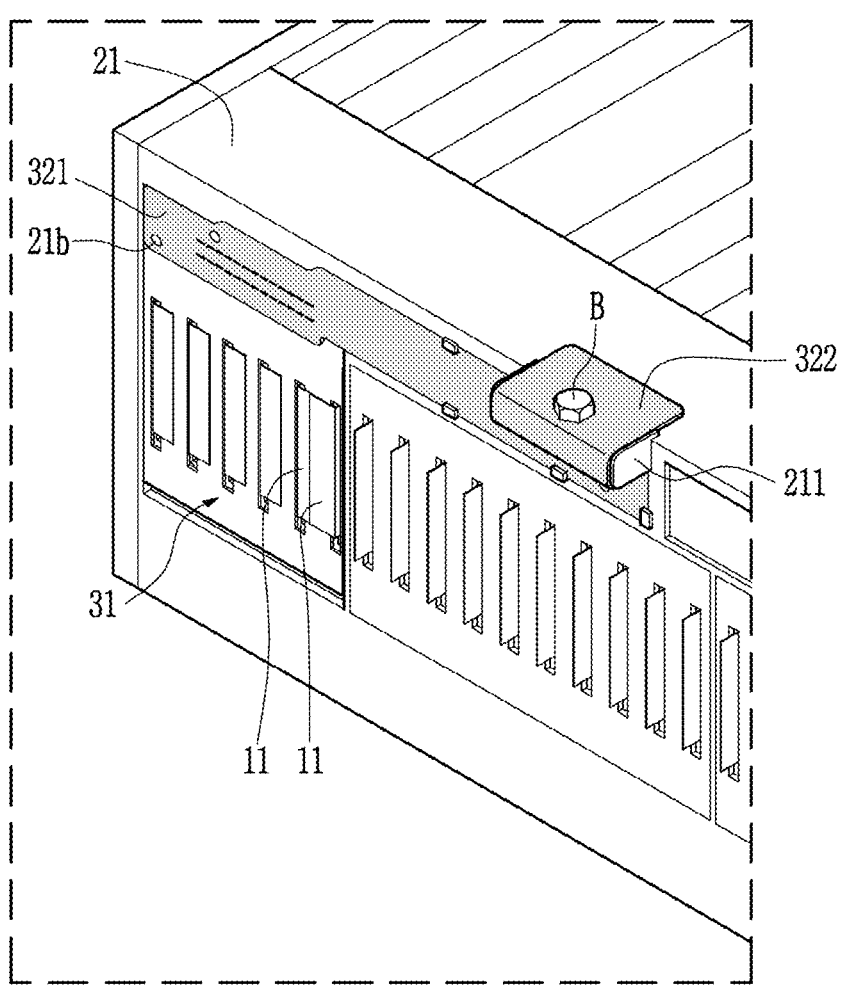
FIG. 3B is a view schematically illustrating another connection method between the busbar plate and the electrode tabs.
Figure 4:
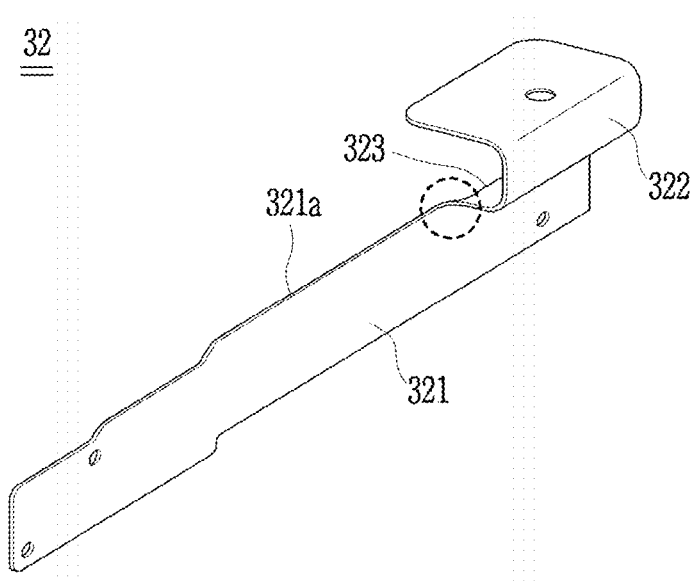
FIG. 4 is a perspective view illustrating, as viewed from one side, a busbar of the battery module according to an embodiment of the present disclosure.
Figure 5:
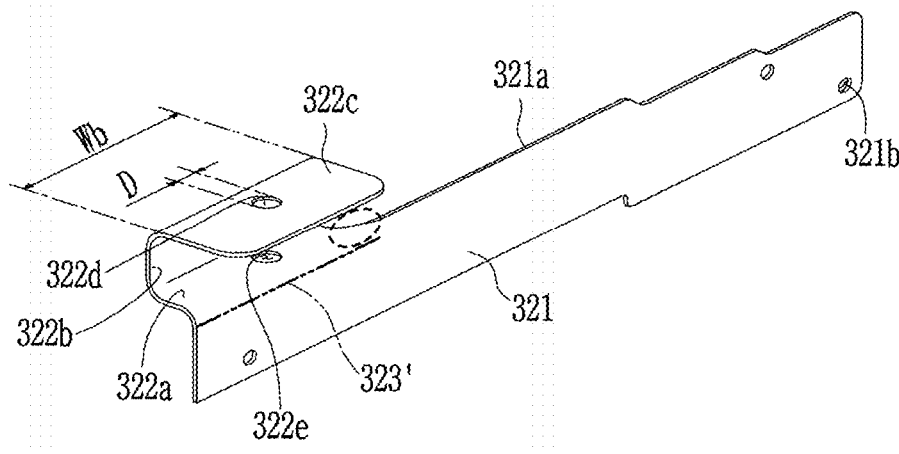
FIG. 5 is a perspective view illustrating the busbar shown in FIG. 4 as viewed from the other side.
Figure 6:
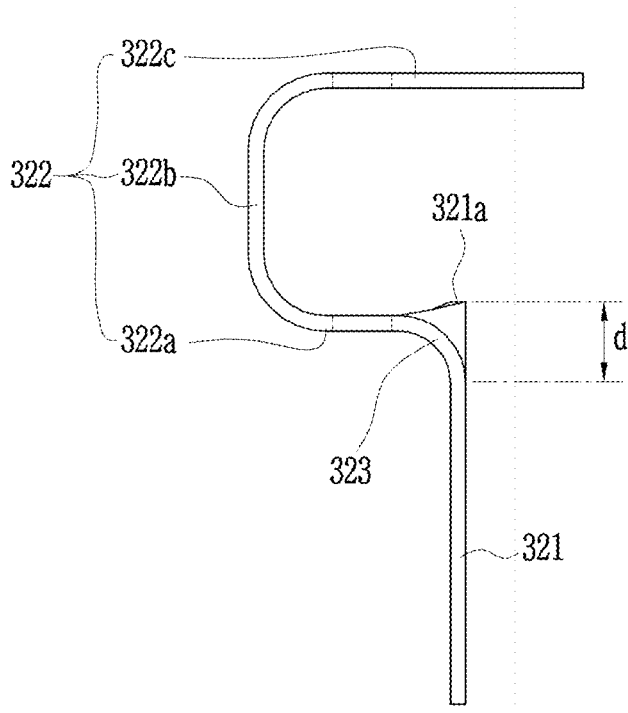
FIG. 6 is a side view illustrating the busbar shown in FIG. 4.
Figure 7:
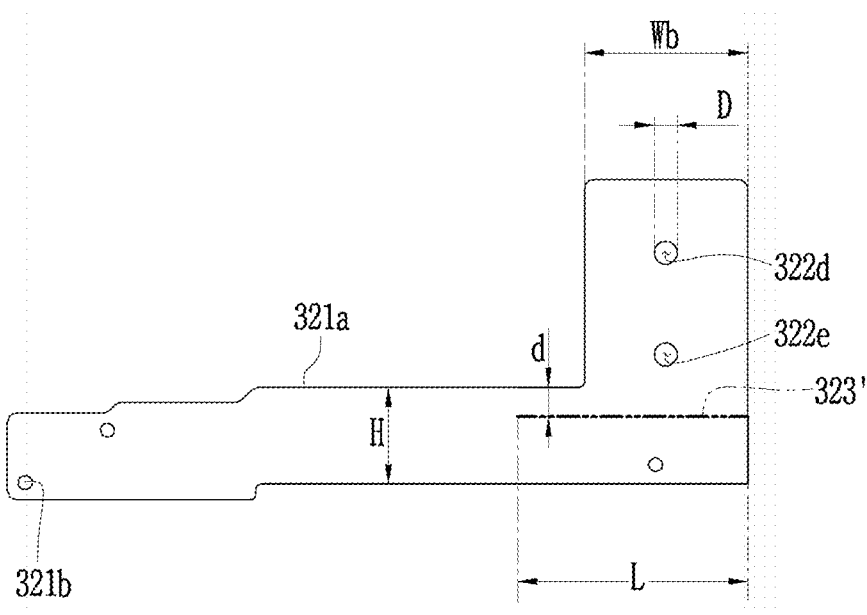
FIG. 7 is an exploded view schematically illustrating the busbar shown in FIG. 4.

The busbar plate 31 may electrically connect the plurality of battery cells 10 to each other by maintaining a reliable connection state with the electrode tabs 11 respectively inserted and arranged in the busbar holes 31a To this end, as shown in FIGS. 1 and 2, the electrode tabs 11 respectively passes through the busbar holes 31a and are bent (refer to FIG. 3A or FIG. 3B) so as to come into contact with one surface of the busbar plate 31. Preferably, the bent electrode tabs 11 may be fixedly positioned on the busbar plate 31 more reliably through a welding method laser welding). As shown in FIG. 3A, each of the electrode tabs 11 is in direct face-to-face contact with the busbar plate 31 by bending a free end thereof at 90 degrees in parallel to one surface of the busbar plate 31, whereby a high-capacity battery may be realized. According to at least one embodiment, some of electrode tabs 11 may be coupled to one surface of the busbar plate 31 by bending the free end thereof in a first lateral direction, and some of the rest of the electrode tabs may be bent in a second lateral direction opposite to the first lateral direction to be coupled to the one surface of the busbar plate 31. For example, even in a limited space where the space for bending in the first lateral direction may not be secured because each electrode tab 11 bent in the second direction extends from each outermost battery cell among the plurality of battery cells, a reliable connection state between the electrode tabs 11 and the busbar plate 31 may be ensured by the electrode tab 11 bent in the second lateral direction. In addition, in the present disclosure, by bending an electrode tab 11 bent in the first lateral direction and an electrode tab 11 bent in the second lateral direction to overlap each other as shown in FIG. 3B, the electrode tabs 11 arranged adjacently with each other due to the limitation of the space for bending may be connected to the busbar plate 31.

In addition, the busbar plate 31 has a first position determination hole 31b perforated therein which corresponds to a coupling protrusion 21b extending outwardly from one side of the side plate 21, so as to be placed in a regular position on the side plate 21. The first position determination hole 31b has a size allowing passing through of the coupling protrusion 21b.

The busbar plate 31 is formed to have a structure corresponding to the shape of the outer surface of the side plate 21 and is arranged in close contact with the side plate 21, thereby reducing the occupied volume of the battery module.

Preferably, in the present disclosure, the electric current of the battery cells 10 may be provided to an external component (not shown) by contacting the busbar 32 on the busbar plate 31 positioned on an outermost side of the battery module. In other words, the busbar 32 is a component that is electrically connected, from the battery module, to electrical equipment (of a vehicle), so as to supply electric energy instead of using an electric wire.

As shown in FIG. 1, the battery module interconnects a flexible printed circuit board 41 with a pair of busbars 32 respectively arranged on opposite sides in the extending[?] direction of the electrode tabs 11. The high-voltage busbar 32 may transmit current generated in each battery cell 10 to the outside through a negative electrode on one side of the battery module and a positive electrode on the other side of the battery module.

As shown in FIGS. 4-7, the busbar 32 includes: a body connector 321; and a bent connector 322 branched outwardly from a side edge 321a formed along the longitudinal direction of the body connector 321. Preferably, the bent part 323, which is a bending starting point of the bent connector 322, is configured to be arranged within the body connector 321. As shown, the body connector 321 has a plate shape and is arranged to be contactable on an upper side of the busbar plate 31, and extends lengthwise in a width direction of the busbar plate 31. The bent connector 322 is extended lengthwise, in a shape of a strip, from an end of the side edge 321a positioned at a second end of the body connector 321, and may be bent at a predetermined angle, preferably vertically, from the body connector 321 by the bent part 323. According to an embodiment, as shown, the bent connector 322 may be bent twice or more in a U-shape along the longitudinal direction thereof so as to surround the module terminal 211 extending outwardly from the side plate 21.

In addition, the body connector 321 has a first position determination hole 31b perforated in a first end thereof and corresponding to the coupling protrusion 21b extending outwardly through the first position determination hole 31b of the busbar plate, so as to be aligned in the regular position of the busbar plate 31. The second positioning hole 321b also has a size that allows the coupling protrusion 21b to be inserted thereinto. Preferably, the present disclosure allows the coupling protrusion 21b to pass through the first and second position determination holes 31b and 321b of the busbar assembly 30, so that a part of the coupling protrusion 21b melted by heat in a thermal fusion process is fixed to the inside of the first and second position coupling holes 31b and 321b described above, whereby the busbar assembly 30 may be fixed in the position on the side plate 21.

The body connector 321 of the busbar 32 may be integrally fused with the busbar plate 31 by a welding method, more preferably laser welding. As is known to those skilled in the art, such laser welding has a high energy density, so that thermal damage to parts may be reduced and high quality and precision of welding may be provided, thereby having an advantage that the welding strength between the busbar plate 31 and the busbar 32 may be improved. For reference, in the busbar assembly 30, areas to be overlapped with each other, that is, an area indicated by a dotted line in an inner area of the busbar plate 31 and an area indicated by a dotted line in an inner area of the body connector 321 of the busbar 32 may be combined together by welding.

Unlike the related art, the busbar 32, according to various embodiments of the present disclosure, is not provided with a cutout part formed thereon, such as a notch in a bent position, but rather uses the bent part 323 as a means to provide an identical cross-sectional area to the electric current path (i.e., passage) that connects the body connector 321 and the bent connector 322 to each other, so as to have the identical internal resistance value, whereby electric current may be transmitted stably without an electric current bottleneck phenomenon.

The busbar 32 integrally arranges a fixed end of the bent connector 322 on the side edge 321a of the body connector 321, and with a folding line 323' marked with a double-dotted line as a boundary, the fixed end of the bent connector 322 is formed to be bent from the bent part 323 and adjacent to the side edge 321a of the body connector 321. In forming the bend, the busbar 32 may extend the bent connector 322 perpendicularly relative to the body connector 321 by bending the bent part 323 along the folding line 323' that is to be virtually positioned within the body connector 321. Specifically, the folding line 323' is a bending starting point of the bent connector 322, and is spaced apart and positioned with a predetermined distance d from the side edge 321a of the body connector 321, so as to be adjacent to and parallel to the fixed end of the bent connector 322. The folding line 323' is positioned between the side edge 321a of the body connector 321 and a center line (i.e., a halfway point of a height H) of the body connector 321.

That is, while bending around and deforming the fixed end of the bent connector 322 perpendicularly from the body connector 321 by using the folding line 323', as a boundary or reference, positioned more inward than the side edge 321a where the fixed end of the bent connector 322 is positioned, an intersection area where the fixed end of the bent connector 322 and the body connector 321 intersect is not cut, but the busbar 32 may be twisted in a bending direction due to the ductility of the busbar 32 to maintain (constantly) the cross-sectional area of the bent connector 322.

As described above, in forming the bend, the busbar 32 extends a length L of the folding line 323' to be longer than a width of the fixed end of the bent connector 322 in order to induce a torsion phenomenon that obliquely bends one or both sides of the intersection area (i.e., an arc part in FIGS. 4 and 5) of the bent connector 322 and the body connector 321. For reference, the busbar 32 shown in the drawings of the present disclosure provides the intersection area of the bent connector 322 and the body connector 321 only on one side of the busbar 32 by arranging the bent connector 322 at an end of the side edge 321a of the body connector 321.

Furthermore, according to various embodiments of the present disclosure, the busbar plate 31 and the busbar 32 may be composed of a conductive metal material to ensure reliable electrical connection with the electrode tabs 11. As described above, the busbar plate 31 and the busbar 32 should be made of the same material in consideration of thermal expansion and uniformity in a process of coupling the same to each other by a laser-welding method. Incidentally, in the present disclosure, the busbar 32 may be fastened to the side plate 21 of the battery module using various coupling methods. As shown, according to various embodiments of the present disclosure, the busbar assembly 30 may be fixed on the side plate 21 by coupling the bent-formed bent connector 322 of the busbar 32 to the module terminal 211 of the side plate 21 using a fitting method, and additionally, the bent connector 322 and the module terminal 211 may be fastened to each other using a bolting method (refer to FIGS. 3A and 3B). As described above, for bolting fastening the busbar 32 and the side plate 21 of the busbar assembly 30, various embodiments of the present disclosure include a female screw hole 211a perforated in a thickness direction of the module terminal 211, and at the same time has each of through-holes 322d and 322e respectively formed in two opposite surfaces of the bent connector 322 bent-formed in a U-shape, so as to correspond to the female screw hole 211a.

The bent connector 322 is formed by being bent two or more times along the longitudinal direction in a U-shape open to a side so as to surround the module terminal 211, and is configured to include: a first extension 322a bent in a first direction to be perpendicular to the body connector 321; a second extension 322b bent upward from the first extension 322a in a second direction; and a third extension 322c bent from the second extension 322b in a third direction opposite to the first extension 322a. Here, the busbar 32 according to various embodiments of the present disclosure extends to the first extension of the bent connector 322 with the side edge 321a of the body connector 321 as a straight line, and specifically, is formed to smoothly lead to the first extension 322a of the bent connector 322 without the notch on the side edge 321a In addition, as may be seen in FIG. 6, the length of the third extension 322c may be extended longer than the length of the first extension 322a to protrude more outwardly than the body connector 321.

In addition, the first extension 322a has a through-hole 322e perforated therein and is arranged to face a lower surface of the module terminal 211, and at the same time, the third extension 322c has a through-hole 322d perforated therein and is arranged to face an upper surface of the module terminal 211. The through-holes 322d and 322e have an inner diameter D that is greater than the outer diameter of a male screw of the bolt B or greater than the inner diameter D' of a female screw hole. Naturally, the inner diameter D of each of through-holes 322d and 322e is formed to be smaller than a head part of the bolt B, and when the bolt B is fastened, the third extension 322c of the bent connector 322 is arranged to face the module terminal 211 and is pressed with the head of the bolt B, so that a part of the busbar 32 may be fixed to the module terminal 211.

In addition, in order to closely fix, on the side plate 21, the busbar assembly 30, specifically, the body connector 321 of the busbar 32 stacked on the busbar plate 31, various embodiments of the present disclosure may be provided with a plurality of locking projections 212 on the side plate 321 to correspond to the edge circumference of the body connector 321a.

The present disclosure includes a sensing module 40 configured to measure a voltage applied from the battery cells 10 through the busbar plate 31, wherein the sensing module 40 is provided with: a flexible printed circuit board (1-PCB) 41 configured to interconnect a pair of busbars 32 positioned on opposite sides in a direction in which the electrode tabs 11 extend; a connector 42 configured to transmit information such as voltage and temperature measured from the busbar 32 to the outside; and a plate-shaped supporter 43 arranged on one or more battery cells 10 arranged in a stack to support and hold the FPCB 41 and the connector 42, which are arranged across the battery module.

As is widely known, the FPCB 41 may contact each busbar plate 31 arranged along the outer surface of the side plate 21 to transmit and receive an electric signal for the sensed voltage value or the like.

The FPCB 41 is closely fixed to the side plate 21 and the supporter 43 so as to not only disperse the stress applied to the FPCB 41, but also to prevent a floating phenomenon, whereby damage to the FPCB 41 may be minimized.

As described above, the present disclosure may apply a high current to an external component even under a high-power battery module environment by using, as a means, a busbar 32 formed by being bent without reducing the cross-sectional area, and to this end, the busbar 32 is characterized in that the bending starting point of the bent part is positioned within the inner area of the body connector 321, not the side edge 321a of the body connector 321.

Although the present disclosure has been described in detail through specific embodiments, this description is for describing the present disclosure in detail, and the present disclosure is not limited thereto. In addition, it will be apparent that the present disclosure may be modified or improved by those skilled in the art within the technical spirit of the present disclosure.

All simple modifications to changes of the present disclosure belong to the scope of the present disclosure, and the specific protection scope of the present disclosure will be made clear by the appended claims.

What is claimed is:

1. A battery module, comprising:
a plurality of battery cells;
a housing configured to accommodate the plurality of battery cells and provided with a side plate on opposite sides in a longitudinal direction of the battery cells;
the side plate made of an electrically insulating material and configured to allow penetration of electrode tabs respectively to extend from the plurality of battery cells;
a busbar plate disposed on the side plate and configured to provide electrical connections between the plurality of battery cells through coupling with the electrode tabs; and
a busbar including a body connector having a longitudinal direction and a side edge and configured to be in face-to-face contact with the busbar plate, and a bent connector branched outwardly from the side edge formed along a direction perpendicular to the body connector and electrically connected to an external component, wherein an intersection area, where the bent connector and the body connector intersect, is twisted in a bending direction of the bent connector,
wherein the bent connector is bent along a folding line parallel to the longitudinal direction of the body connector, and
wherein the folding line is spaced apart and positioned with a predetermined distance from and parallel to the side edge and extends longer than a width of a the bent connector disposed at a portion where the bent connector branches from the body connector.

2. The battery module of claim 1, wherein each electrode tab bent in the second lateral direction extends respectively from each outermost battery cell coupled to the busbar plate among the plurality of battery cells.

3. The battery module of claim 2, wherein each electrode tab bent in the second lateral direction respectively overlaps with each adjacent electrode tab and is coupled to the busbar plate.

4. The battery module of claim 1, wherein the busbar plate and the busbar are coupled to each other by laser welding.

5. The battery module of claim 1, wherein the side plate comprises:
a plurality of holes configured to respectively allow passing through of the electrode tabs;
a coupling protrusion configured to extend outwardly to help align the busbar plate and the busbar with each other; and
a module terminal coupled to the busbar and comprising a female screw hole formed therein in a thickness direction, and the busbar plate comprises:
busbar holes formed at positions respectively corresponding to the holes; and a first position determination hole configured to allow passing through of the coupling protrusion.

6. The battery module of claim 1, wherein the bent connector includes: a first extension configured to extend by being bent in a first direction; a second extension configured to extend by being bent in a second direction; and a third extension configured to extend by being bent in a third direction.

7. The battery module of claim 6, wherein the side edge of the body connector extends to the first extension in a straight line.

8. The battery module of claim 1, wherein the busbar is formed by bending the bent connector into a U-shape that is open to a side thereof to accommodate the module terminal of the side plate.

9. The battery module of claim 1, wherein the bent connector includes through-holes, each having an inner diameter greater than an inner diameter of the female screw hole, at a position corresponding to the female screw hole of the module terminal.

10. The battery module of claim 5, wherein the body connector includes a second position determination hole at a position corresponding to a first position determination hole of the busbar plate.

11. The battery module of claim 1, wherein at least one of the electrode tabs is bent in a first lateral direction to be coupled to the busbar plate, and at least one of the electrode tabs is bent in a second lateral direction opposite to the first lateral direction to be coupled to the busbar plate.

* * * * *